US012810741B2

(12) United States Patent
Nakadai

(10) Patent No.: US 12,810,741 B2
(45) Date of Patent: Nov. 24, 2026

(54) RISK EVALUATION DEVICE, RISK EVALUATION METHOD, AND RECORDING MEDIUM

(71) Applicant: NEC Corporation, Tokyo (JP)

(72) Inventor: Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/854,092

(22) PCT Filed: May 9, 2022

(86) PCT No.: PCT/JP2022/019658

§ 371 (c)(1),
(2) Date: Oct. 4, 2024

(87) PCT Pub. No.: WO2023/218498

PCT Pub. Date: Nov. 16, 2023

(65) Prior Publication Data

US 2025/0246085 A1 Jul. 31, 2025

(51) Int. Cl.
*G08G 5/70* (2025.01)

(52) U.S. Cl.
CPC .................................... *G08G 5/70* (2025.01)

(58) Field of Classification Search
CPC .................................. G08G 5/70; G08G 5/00
See application file for complete search history.

(56) References Cited

U.S. PATENT DOCUMENTS

| | | | | |
|---|---|---|---|---|
| 7,194,353 | B1 * | 3/2007 | Baldwin | G05D 1/106 701/528 |
| 2016/0130013 | A1 * | 5/2016 | Rangan | B64D 45/00 340/963 |
| 2016/0260331 | A1 * | 9/2016 | Salentiny | G08G 5/32 |
| 2021/0358310 | A1 * | 11/2021 | Sachs | B60L 58/10 |
| 2022/0108049 | A1 * | 4/2022 | Letwin | G06F 30/15 |
| 2022/0297726 | A1 * | 9/2022 | Zhang | G01C 21/3453 |
| 2023/0339459 | A1 * | 10/2023 | Chi-Johnston | G06F 11/3668 |
| 2023/0408288 | A1 * | 12/2023 | White | B64C 39/024 |

FOREIGN PATENT DOCUMENTS

| | | |
|---|---|---|
| JP | 2020-112574 A | 7/2020 |
| WO | 2018/110634 A1 | 6/2018 |
| WO | 2021/157034 A1 | 8/2021 |

OTHER PUBLICATIONS

International Search Report for PCT Application No. PCT/JP2022/019658, mailed on Jul. 12, 2022.

* cited by examiner

*Primary Examiner* — Nhi Q Bui

(57) ABSTRACT

A risk evaluation device includes an acquisition means and a risk evaluation means. The acquisition means acquires input information which includes location information indicating a location of a flying object, airframe information of the flying object, weather information, and environmental information. The risk evaluation means evaluates a risk in a case where the flying object is at the location, using a risk evaluation model which has been trained, based on the input information.

20 Claims, 10 Drawing Sheets

RISK VALUE OF RISK A
(RISK A: RISK OF DRONE HITTING PERSON)

| SIMULATION RESULT | RISK VALUE |
|---|---|
| S1 | 1 |
| S2 | 1 |
| S3 | 0 |
| S4 | 0 |
| S5 | 0 |

AVERAGE RISK=0.4

EXAMPLE OF RISK EVALUATION MODEL

RISK EVALUATION DEVICE, RISK EVALUATION METHOD, AND RECORDING MEDIUM

This application is a National Stage Entry of PCT/JP2022/019658 filed on May 9, 2022, the contents of all of which are incorporated herein by reference, in their entirety.

TECHNICAL FIELD

The present disclosure relates to a risk evaluation associated with flight of a flying object.

BACKGROUND ART

Recently, it has been studied to utilize drones for various applications. However, various risks are anticipated when flying a drone, including a risk of the drone itself crashing, a risk of falling luggage carried by the drone, and the like. Patent Document 1 proposes a device for collecting information which can be used for calculating the risk of the drone or other unmanned flying object crashing.

PRECEDING TECHNICAL REFERENCES

Patent Document

Patent Document 1: Japanese Laid-open Patent Publication No. 2020-112574

SUMMARY

Problem to be Solved by the Invention

Usually, an operator will make a flight plan for a drone by looking at a map such as a map application; however, it is important to confirm safety of the flight plan before actually flying the drone.

It is one object of the present disclosure to provide a risk evaluation device capable of evaluating in advance a risk in a case of flying a flying object such as the drone.

Means for Solving the Problem

According to an example aspect of the present disclosure, there is provided a risk evaluation device including:

- an acquisition means configured to acquire input information which includes location information indicating a location of a flying object, airframe information of the flying object, weather information, and environmental information; and
- a risk evaluation means configured to evaluate a risk in a case where the flying object is at the location, using a risk evaluation model which has been trained, based on the input information.

According to another example aspect of the present disclosure, there is provided a risk evaluation method including:

- acquiring input information which includes location information indicating a location of a flying object, airframe information of the flying object, weather information, and environmental information; and
- evaluating a risk in a case where the flying object is at the location, using a risk evaluation model which has been trained, based on the input information.

According to a further example aspect of the present disclosure, there is provided a recording medium storing a program, the program causing a computer to perform a process including:

- acquiring input information which includes location information indicating a location of a flying object, airframe information of the flying object, weather information, and environmental information; and
- evaluating a risk in a case where the flying object is at the location, using a risk evaluation model which has been trained, based on the input information.

Effect of the Invention

According to the present disclosure, it becomes possible to evaluate a risk in advance in a case of flying a flying object such as a drone.

EXAMPLE EMBODIMENTS

In the following, example embodiments will be described with reference to the accompanying drawings.

First Example Embodiment

[Overall Configuration]

Figure 1:
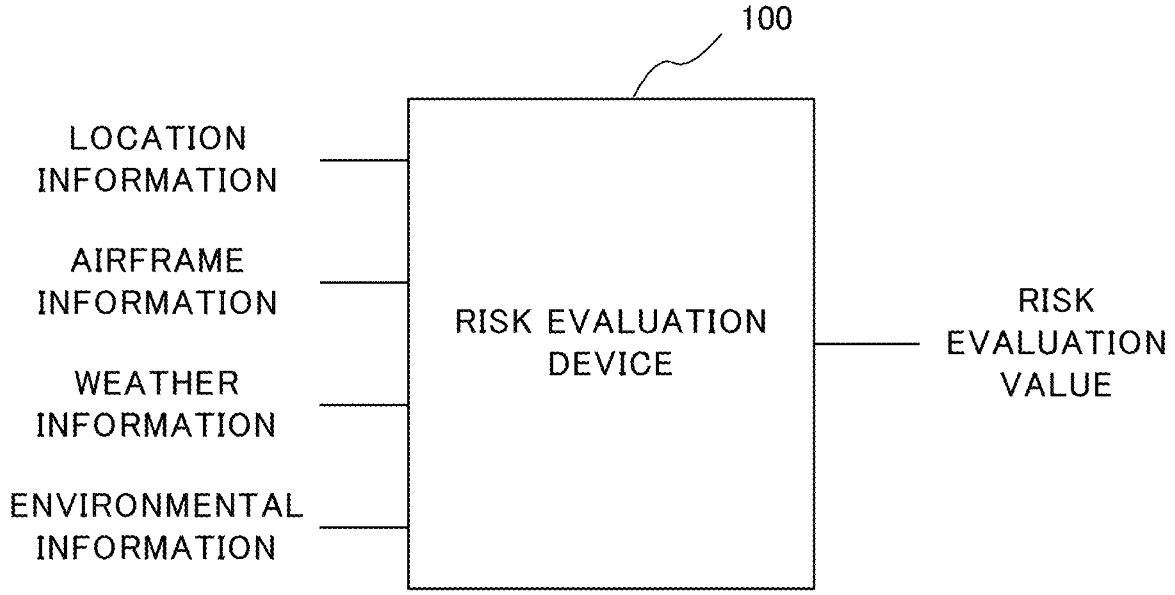
FIG. 1 illustrates a risk evaluation device according to a first example embodiment.

FIG. 1 illustrates a risk evaluation device according to the first example embodiment. A risk evaluation device 100*a* is formed by a computer, such as a personal computer (PC). The risk evaluation device 100*a* evaluates risks which may occur when a flying object such as a drone is flown according to a planned route. In the following, an example of the flying object will be described using the drone; however, the flying object in the present disclosure is not limited to the flying object generally referred to as the drone, but also includes various unmanned flying objects which fly under an external control.

As input information, location information, airframe information, weather information and environmental information are input to the risk evaluation device 100*a*. The risk evaluation device 100*a* includes a risk evaluation model trained in advance. The risk evaluation device 100*a* evaluates the risk based on the input information using the risk evaluation model, and outputs a risk evaluation value as a risk evaluation result. By evaluating the risk in advance using the risk evaluation device 100*a*, it is possible to predict in advance the risk which may occur when the drone is flown according to the planned route.

[Hardware Configuration]

Figure 2:
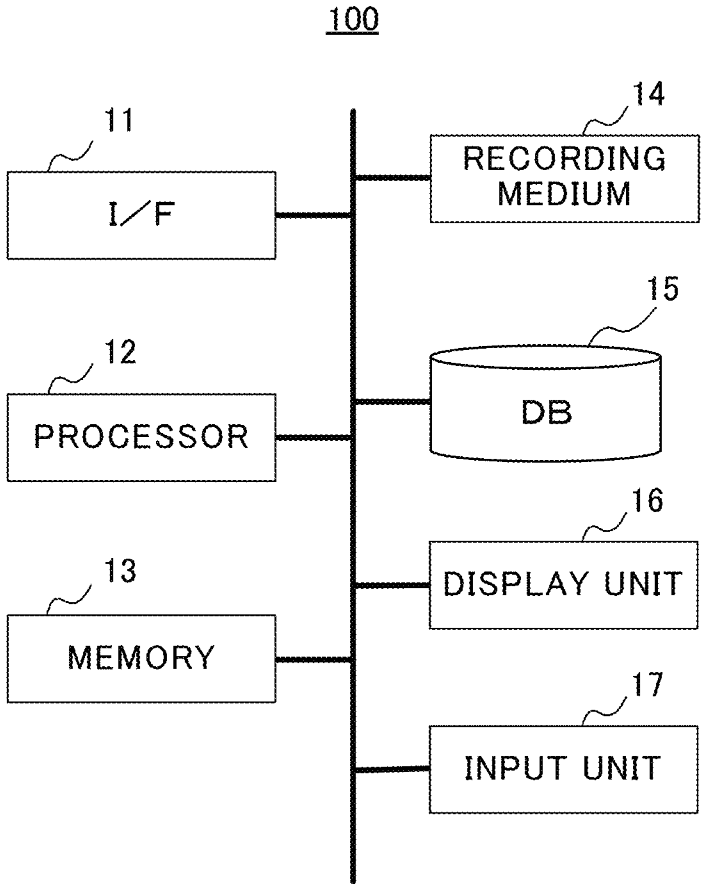
FIG. 2 is a block diagram illustrating a hardware configuration of the risk evaluation device.

FIG. 2 is a block diagram illustrating a hardware configuration of the risk evaluation device 100*a*. As illustrated, the risk evaluation device 100*a* includes an interface (I/F) 11, a processor 12, a memory 13, a recording medium 14, a database (DB) 15, a display unit 16, and an input unit 17.

The I/F 11 inputs and outputs data to and from an external device. Specifically, the input information such as the location information, the airframe information, or the like is input to the risk evaluation device 100*a* through the I/F 11. In addition, the risk evaluation value generated by the risk evaluation device 100*a* is output to the external device through the I/F 11 as necessary.

The processor 12 is a computer such as a CPU (Central Processing Unit which controls the entire risk evaluation device 100*a* by executing programs prepared in advance. The processor 12 may be a GPU (Graphics Processing Unit), a TPU (Tensor Processing Unit), a quantum processor or an FPGA (Field Programmable Gate Array). The processor 12 performs a training process of a risk evaluation model and a risk evaluation process using the trained risk evaluation model, as described below.

The memory 13 is formed by a ROM (Read Only Memory) and a RAM (Random Access Memory). The memory 13 is also used as a working memory during executions of various processes by the processor 12.

The recording medium 14 is a non-volatile and non-transitory recording medium such as a disk-shaped recording medium, a semiconductor memory, or the like, and is formed to be detachable to the risk evaluation device 100*a*. The recording medium 14 records various programs executed by the processor 12. When the risk evaluation device 100*a* executes various kinds of processes, each program recorded in the recording medium 14 is loaded into the memory 13 and executed by the processor 12.

The DB 15 stores data to be used and data generated by the risk evaluation device 100*a*. Specifically, the location information, the airframe information, the weather information, the environmental information, and the like input as input information are stored in the DB 15. Moreover, the DB 15 stores data to be used for training the risk evaluation model, which will be described later, for instance, risk definition data, simulation results of a behavior of the drone. In addition, the data on the risk evaluation model obtained by the training are stored in the DB 15. Note that in a case where a capacity of the memory 13 is sufficient, the above data may be stored in the memory 13.

The display unit 16 is a liquid crystal display device, for instance, and displays the risk evaluation value generated by the risk evaluation device 100*a*. The input unit 17 is, for instance, a mouse or a keyboard, and is used by a user to make necessary instructions and input at a time of training the risk evaluation and at a time of the risk evaluation process using the risk evaluation model.

[Functional Configuration for Model Training]

Figure 3:
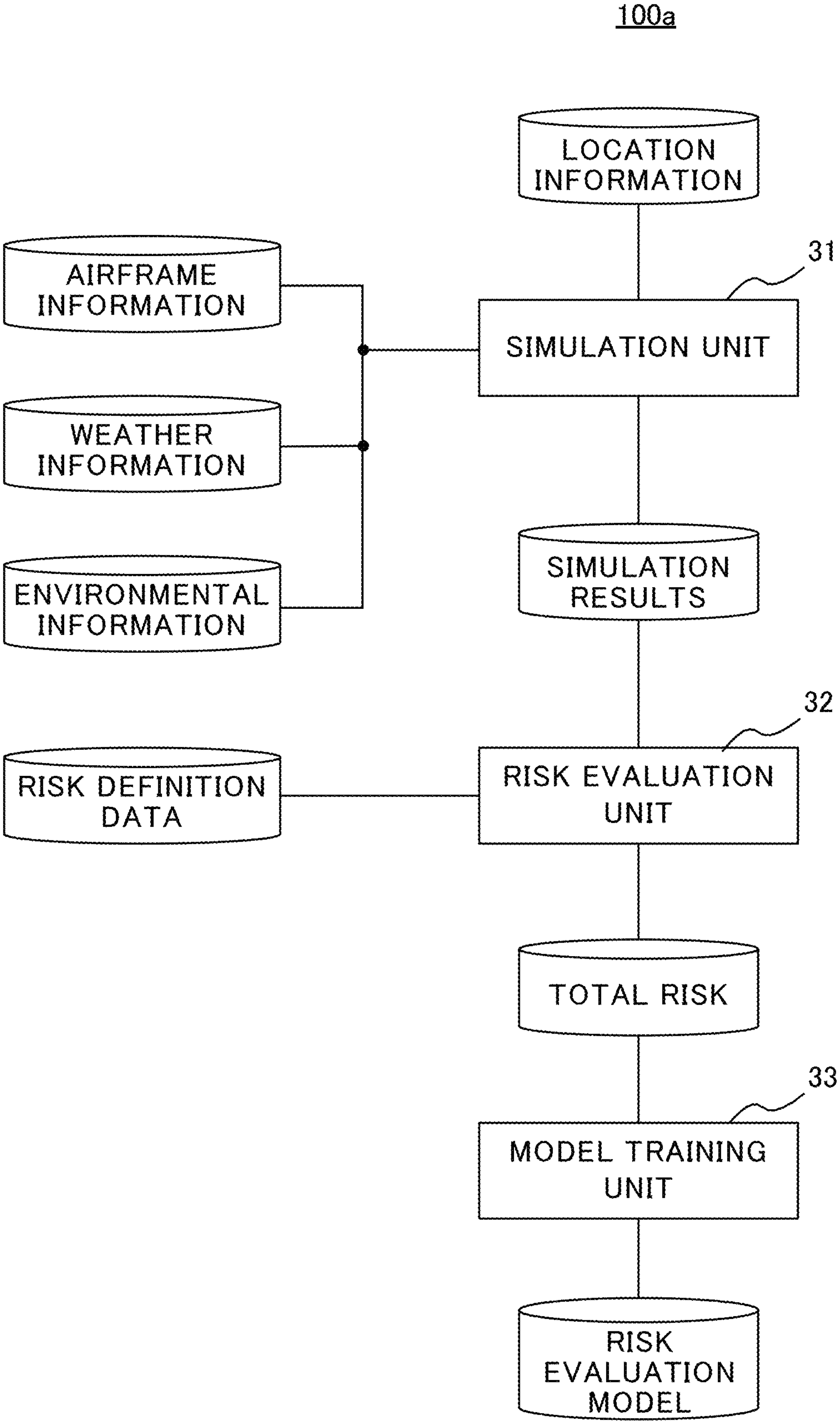
FIG. 3 is a block diagram illustrating a functional configuration

FIG. 3 is a block diagram illustrating a functional configuration for a model training of the risk evaluation device 100*a* according to the first example embodiment. The risk evaluation device 100*a* includes a simulation unit 31, a risk evaluation unit 32, and a model training unit 33 as a functional configuration for model training.

The simulation unit 31 performs a simulation of the behavior of the drone based on the input information, and outputs a simulation result indicating a predictive behavior of the drone. Specifically, the location information, the airframe information, the weather information, and the environmental information are input to the simulation unit 31, as input information. The input information is used as a condition of the simulation.

The location information indicates a three-dimensional position of the drone, for instance, latitude, longitude, altitude, or the like in a real geographical space can be used. In the simulation of the behavior of the drone, a virtual geographical space may be used instead of the real geographical space. In this case, the location information is to indicate the three-dimensional position in its virtual geographical space.

The airframe information is information concerning the drone itself, including various types of information such as a size, a shape, a type of the drone, a type of an engine, a count of wings, or the like, for instance. Moreover, as the airframe information, movement information of the drone, for instance, a movement direction of the drone, a moving speed, acceleration, and the like may be used.

The weather information is information indicating a weather condition in an area where the drone flies, and indicates, for instance, weather, temperature, humidity, wind direction, wind speed, and the like.

The environmental information is information indicating the geographical environment in the area where the drone flies, and includes topographical information concerning the ground. Typically, so-called map information can be used as the topographical information. Incidentally, the topographical information includes information indicating a state of the ground, for instance, classifications of sea, river, land, mountainous region, road, city area. Especially, in order to evaluate the risk caused by the crash of the drone, it is preferable that the environmental information includes information such as whether the area has many buildings, whether the area has many people, and the like.

The simulation unit 31 uses the location information, the airframe information, the weather information, and the environmental information which are input, to simulate the behavior of the drone in the event of a certain trouble or a fault with the drone (hereinafter, simply referred to as a "trouble").

Figure 4:
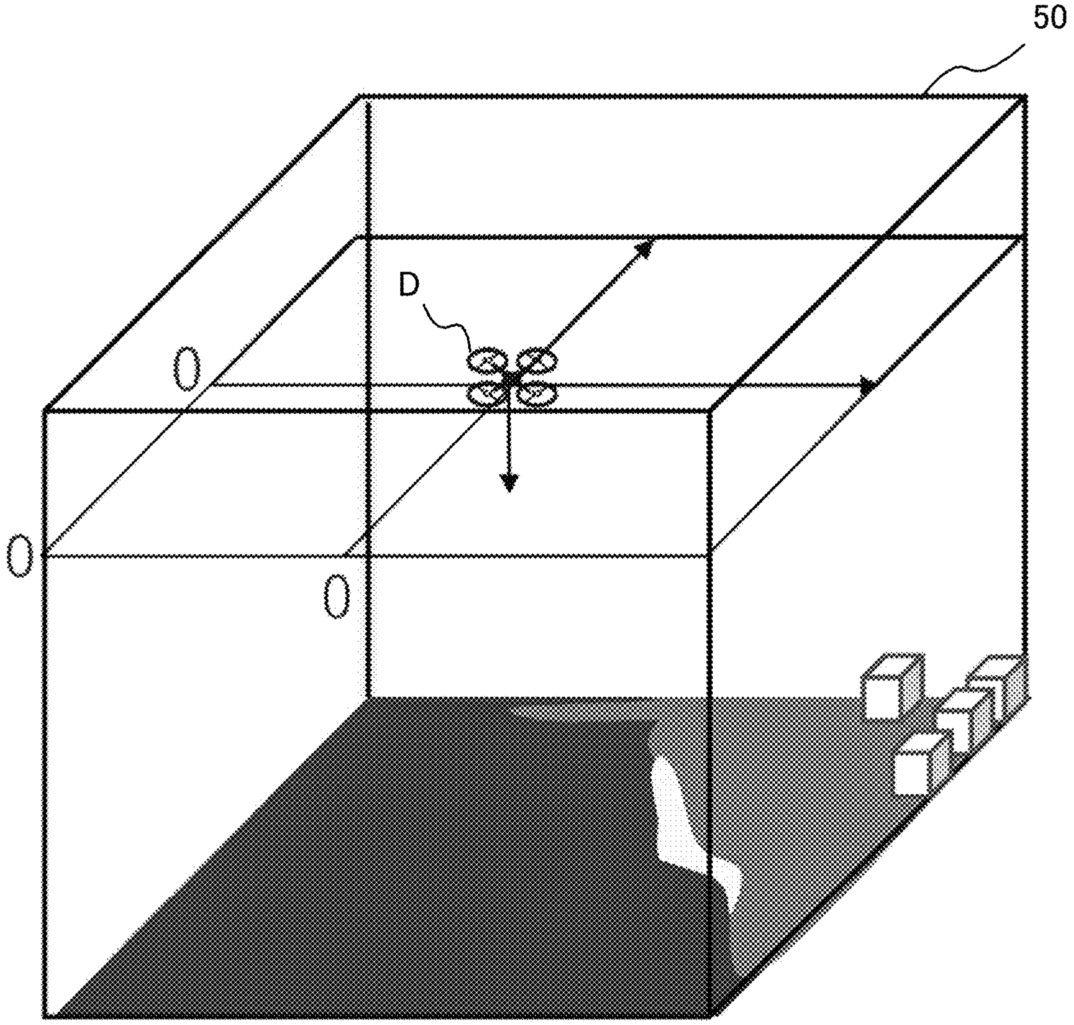
FIG. 4 illustrates an example of simulating a behavior of a drone.

FIG. 4 illustrates an example of simulating the behavior of the drone. The simulation unit 31 sets a simulation space 50 to a location of a drone D as an origin based on the input location information. The simulation space 50 is the geographical space in a predetermined range from the location of the drone D. Then, the simulation unit 31 simulates the behavior of the drone D in a case where a trouble occurs in the drone D using the airframe information, and the weather information and the environmental information in the simulation space 50. Note that the simulation unit 31 sets the probability of occurrence of the trouble based on the input information, and performs the simulation.

Figure 5A:
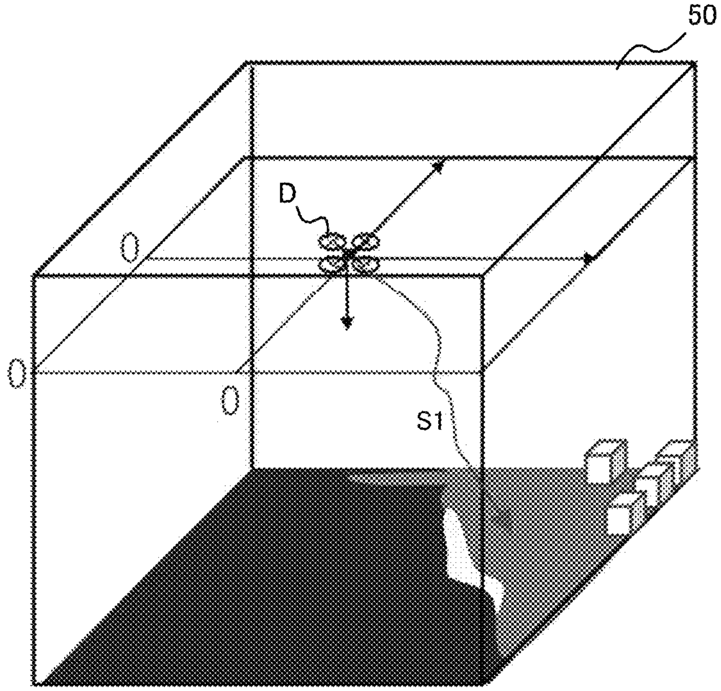
FIG. 5 illustrates an example of a simulation result of drone crashing.
Figure 5B:
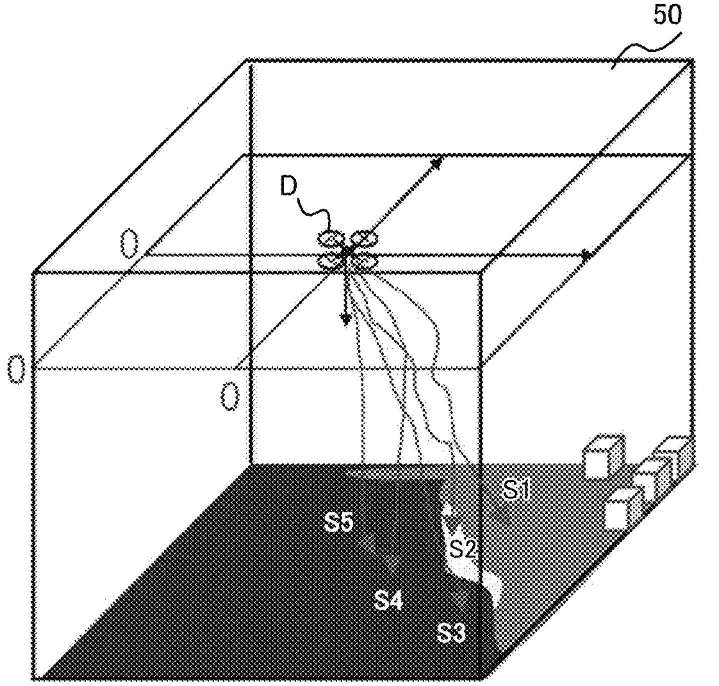

For instance, when the trouble occurs in the engine of the drone D, the simulation unit 31 performs the simulation in which the drone D crashes based on the airframe information of the drone D, the weather information at that time, and the environmental information. FIG. 5A illustrates an example of the simulation result of the crash of the drone D. In the example in FIG. 5A, a simulation result S1 illustrates that the drone D crashes to the ground following a trajectory indicated by a sign S1. The simulation unit 31 performs the simulation several times while keeping the location and airframe information of the drone D the same, and changing the movement information and weather information of the drone D. Accordingly, as illustrated in FIG. 5B, simulation results S2 to S5 different from the simulation result S1 are obtained.

The simulation unit 31 performs the simulation several times while changing the location information, the airframe information, the weather information, the environmental information in an area planned for the drone to fly. Moreover, the simulation unit 31 changes the type of trouble occurring with the drone, and performs the simulation several times. The troubles occurring on the drone include, for instance, an engine trouble, a communication equipment trouble, a propeller trouble, being blown by a strong wind, and a contact with a bird and another drone. Accordingly, it is possible to obtain the simulation result of behaviors of various drones when various troubles occur under various weather conditions in the area where each drone is planned to fly. The simulation unit 31 outputs each simulation result to the risk evaluation unit 32. Note that as the simulation, any of various techniques such as a Monte Carlo simulation using a random number can be used.

The risk evaluation unit 32 evaluates the risk corresponding to the behavior of the drone obtained as the simulation result, by using the risk definition data. Risk definition data define the risk caused mainly by the crash of the drone according to the state of the ground represented by the map information. There are several risks which can arise for a case where the drone crashes, including a risk of the drone hitting a person, a risk of an environmental pollution, and the like. The Risk definition data define a risk value for each risk.

Figure 6:
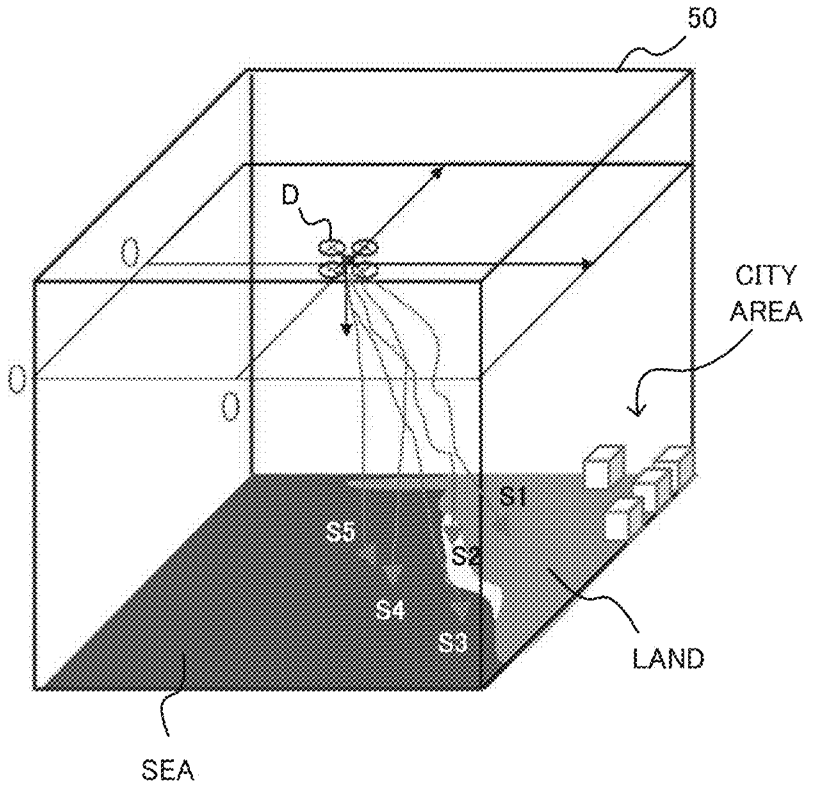
FIG. 6 illustrates an example of evaluating a risk by a risk evaluation unit.

FIG. 6 illustrates an example in which the risk evaluation unit 32 evaluates the risk using the risk definition data. Now it is considered that a risk of a crashed drone hitting a person as a risk A. Assume that the risk definition data specify that the risk value in a case where the drone crashes into the ocean is "0" and the risk value in a case where the drone crashes on the ground is "1". In addition, as illustrated in FIG. 6, the simulation results S1 to S5 are obtained for the behavior of the drone. In the simulation results S1 and S2, since the drone D crashes to the ground, the risk value is "1". On the other hand, in the simulation results S3 to S5, since the drone D falling into the sea, the risk value is "0". Therefore, the average risk of the simulation results S1 to S5 is "0.4" for the risk A. Thus, the risk evaluation unit 32 can calculate the risk value when the drone D is at a certain point.

Note that in the above example, the risk definition data of the risk A sets the risk value as "1" for a case where the drone crashes to the ground; however, for instance, the ground may be divided into an area which is crowded with people such as the city area and an area which is less crowded with people, and thus, the risk value in the area which is crowded with people may be set as "2" and the risk value in the area which is less crowded with people may be set as "1", in order to distinguish respective areas.

Next, a specific calculation method of the risk value will be described. The risk evaluation unit 32 calculates a total risk R when the drone is at a certain point by the following formula (1).

[Formula 1]

$$R = \sum_{t=1}^{T} p(\text{happen}_t) \frac{1}{S_t} \sum_{i=1}^{S_t} \sum_{j=0}^{J} \text{weight}_j \times \text{risk}_j(\text{tranjectory}_i) \tag{1}$$

In the formula (1), "trajectory;" denotes a trajectory of the drone obtained as the simulation result by the simulation unit 31. As described above, the simulation unit 31 simulates the behavior of the drone in a case where each trouble occurs, for a plurality of troubles t. The trajectory of one simulation result is indicated by "trajectory;". "i" denotes an identifier of each simulation, and "$S_t$" denotes a count of simulations.

"$\text{risk}_j(\ )$" denotes a function representing a risk value. As described previously, the risk definition data define respective risk values for a plurality of risks. "j" denotes a type of risk. Thus, "$\text{risk}_j(\text{trajectory}_i)$" denotes the risk value of a risk j occurred due to a trajectory i acquired as the simulation result.

"$\text{weight}_j$" denotes a weight which is set for each of risks. Several risks have different levels of importance in a case of evaluating the risk caused by a drone crash. For instance, a level of importance for the risk of the drone hitting the person is to be set higher than the level of importance for the risk of the drone falling into the sea. Therefore, the weight is set for each risk, and the total risk R is calculated by considering the level of importance of each risk. In a second half ($1/S_t$ or later) of the formula (1), an average of the risk values is calculated across several simulations by averaging weighted sums of the risk values for a plurality of simulation results regarding trajectory; with the count $S_t$ of simulations.

"$p(\text{happen}_t)$" denotes a probability that the trouble t occurs, and "t" denotes the type of trouble. Therefore, the total risk R is calculated by considering the probability of occurrence of each trouble for the plurality of expected troubles t. Thus, according to the formula (1), the total risk R in a case where the drone is at a certain point is calculated by considering the several risks, respective weights of the several risks, the plurality of troubles, and respective probabilities of occurrence of the plurality of troubles, based on the simulation results acquired by the simulation several times. The risk evaluation unit 32 outputs the total risk R thus calculated to the model training unit 33.

The model training unit 33 trains the risk evaluation model using the input information input to the simulation unit 31 and the total risk output from the risk evaluation unit 32. Specifically, the model training unit 33 performs supervised learning in which the input information including the location information, the airframe information, and the like is set as the input data and the total risk is set as correct answer data, and trains the risk evaluation model. In response to inputs of the location information, the airframe information, the weather information, and the environmental information concerning the drone existing at a certain point, the risk evaluation model obtained by the training outputs an evaluation value of the risk caused by the drone under the condition. The evaluation value to be output is a value indicating the total risk considering the plurality of troubles and the several risks which may occur under the condition.

Figure 7:
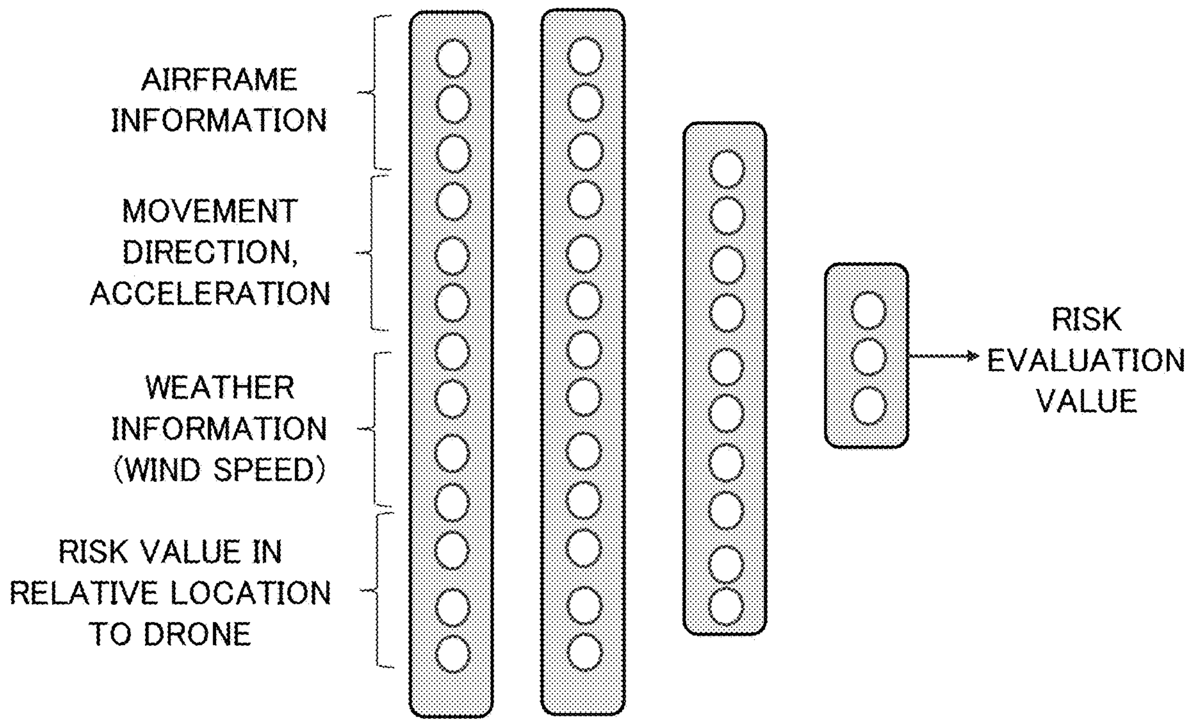
FIG. 7 illustrates an example of a risk evaluation model.

FIG. 7 illustrates an example of the risk evaluation model. In this example, the risk evaluation model is formed by a neural network. As inputs to the risk evaluation model, the airframe information, the movement direction and the acceleration of the drone, the weather information (wind speed), and the risk value at a relative location with respect to the drone are input. The movement direction of and the acceleration of the drone are parts of the airframe information. For instance, the wind speed is given for each cell (each voxel) in a case of dividing X, Y, and Z directions in the simulation space 50 illustrated in FIG. 4 into a plurality of cells. The risk values at the relative location with respect to the drone are given for each cell in the simulation space 50 described above and for each type of risk. Note that the risk value is obtained based on the environmental information and the risk definition data.

[Model Training Process]

Figure 8:
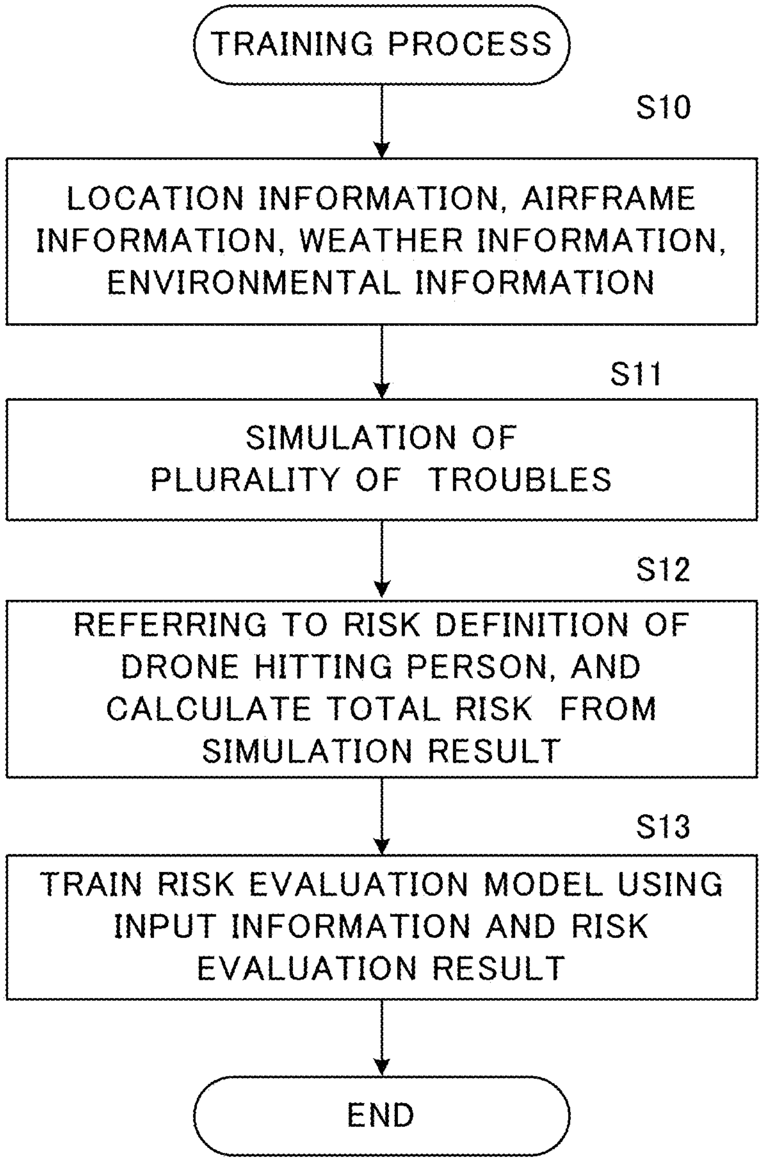
FIG. 8 is a flowchart of a training process of the risk evaluation model.

Next, the training process of the risk evaluation model will be described. FIG. 8 is a flowchart of the training process of the risk evaluation model. This process is realized by the processor 12 illustrated in FIG. 2 which executes programs prepared in advance and operates as respective elements illustrated in FIG. 3.

First, the simulation unit 31 receives the location information, the airframe information, the weather information and the environmental information as the input information (step S10), performs the simulation of the behavior of the drone for the plurality of troubles (step S11). Next, the risk evaluation unit 32 refers to the risk definition data, and calculates the total risk considering the several risks based on the trajectory of the drone indicated by a plurality of simulation results (step S12). Specifically, the risk evaluation unit 32 calculates the total risk R using the aforementioned formula (1) based on the plurality of simulation results. Next, the model training unit 33 trains the risk evaluation model using the input information which is input in step S10 and the total risk R obtained in step S12 (step S13). Then, the model training process is terminated.

[Functional Configuration for Risk Evaluation]

Figure 9:
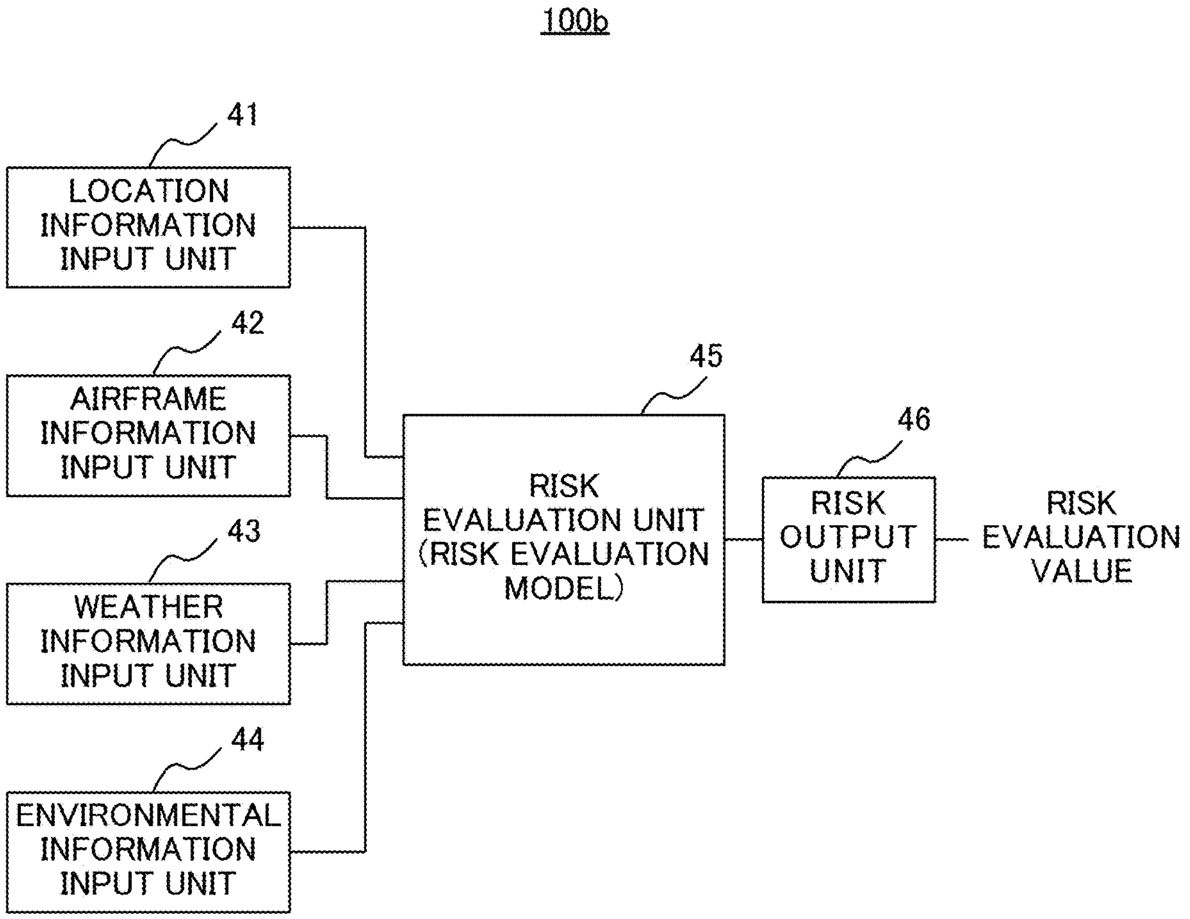
FIG. 9 is a block diagram illustrating a functional configuration for a risk evaluation of the risk evaluation device according to the first example embodiment.

FIG. 9 is a block diagram illustrating a functional configuration for a risk evaluation of the risk evaluation device 100*b* according to the first example embodiment. The risk evaluation device 100*b* includes the location information input unit 41, an airframe information input unit 42, a weather information input unit 43, an environmental information input unit 44, a risk evaluation unit 45, and a risk output unit 46 as the functional configuration for risk evaluation.

The location information indicating the location on the planned flight path of the drone to be subject to risk evaluation is input to the location information input unit 41. The airframe information concerning the drone to be risk evaluation is input to the airframe information input unit 42. The weather information indicating the meteorological conditions to be subject to risk evaluation is input to the weather information input unit 43. The environment to be subject to risk evaluation, specifically terrain information of the area corresponding to the location of the drone is input to the environment information input unit 44.

The risk evaluation unit 45 performs the risk evaluation using the trained risk evaluation model obtained by the model training process described above. Specifically, the risk evaluation unit 45 inputs the input information described above to the risk evaluation model, and obtains the risk evaluation value as the output. Then, the risk evaluation unit 45 outputs the risk evaluation value to the risk output unit 46. The risk output unit 46 presents the risk value to the user as the risk evaluation result. For instance, the risk output unit 46 displays the input risk value on the display unit 16.

The risk evaluation value thus presented to the user is a comprehensive risk value in which the several risks, which may occur when various troubles occur in the drone under the condition specified by the information input to each of the input units described above, are considered. Therefore, the person who plans to fly the drone can evaluate the risk in advance by inputting the location to fly the drone, the airframe information of the drone, the weather condition at that time, the environmental information of the flying area, and the like.

[Risk Evaluation Process]

Figure 10:
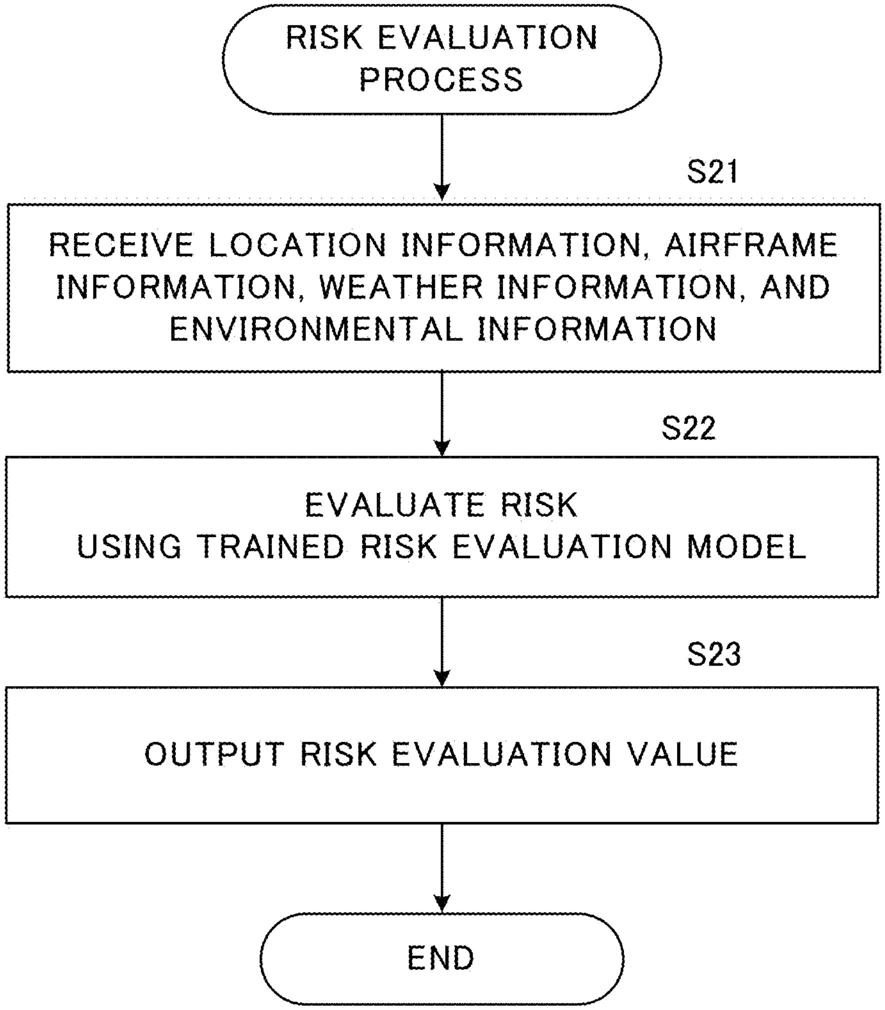
FIG. 10 is a flowchart of a risk evaluation process.

Next, the risk evaluation process by the risk evaluation device 100*b* will be described. FIG. 10 is a flowchart of the risk evaluation process. The risk evaluation process is realized by the processor 12 illustrated in FIG. 2 which executes a corresponding program prepared in advance and operates as elements illustrated in FIG. 9.

First, the location information input unit 41, the airframe information input unit 42, the weather information input unit 43, and the environmental information input unit 44 receives the location information, the airframe information, the weather information, and the environmental information, respectively (step S21). Next, the risk evaluation unit 45 performs the risk evaluation based on the information which is input, using the trained risk evaluation model (step S22), and outputs the risk evaluation value as the evaluation result (step S23). For instance, the risk evaluation unit 45 displays the risk evaluation value on the display unit 16. Then, the risk evaluation process is terminated.

Note that the above risk evaluation value indicates the total risk in a case where there is the drone at the point indicated by the location information which is input. Therefore, it is possible for the user to confirm the risk in the route of the planned flight or in the whole area, by performing the risk evaluation process for a plurality of locations on the route or in the area where the drone is planned to fly.

[Modification]

At the time of the risk evaluation, when displaying the obtained risk value on the display unit 16, the risk evaluation device 100*b* may display the risk value on the map indicating the location of the drone. For instance, the risk evaluation device 100*b* displays the map on the display unit 16. The location information input unit 41 acquires the location information of the point specified by the user with a mouse or the like on the map which is displayed. Then, the risk output unit 46 superimposes and displays the calculated risk value near the location on the map. Accordingly, it is possible for the user to view a point specified as the location of the drone in relation to the risk value at that point in correspondence.

Second Example Embodiment

Figure 11:
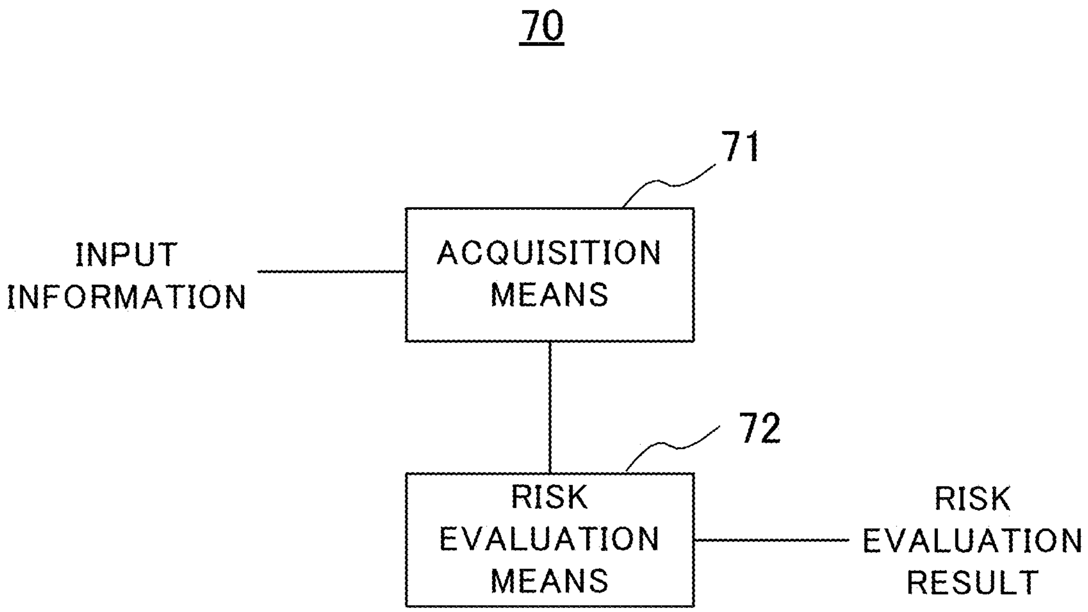
FIG. 11 is a block diagram illustrating a functional configuration of a risk evaluation device according to a second example embodiment.

FIG. 11 is a block diagram illustrating a functional configuration of a risk evaluation device 70 according to a second example embodiment. The risk evaluation device 70 includes an acquisition means 71 and a risk evaluation means 72.

Figure 12:
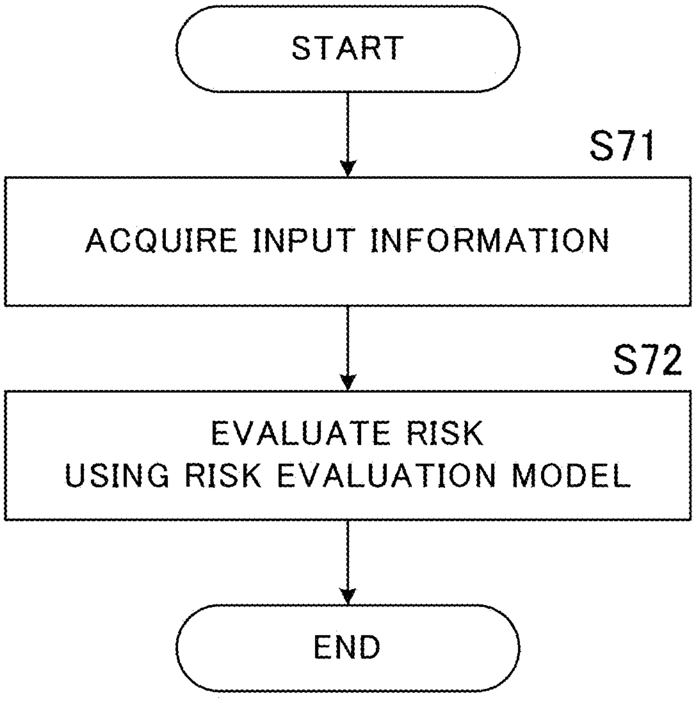
FIG. 12 is a flowchart of a process by the risk evaluation device according to the second example embodiment.

FIG. 12 is a flowchart of a process performed by the risk evaluation device 70 according to the second example embodiment. The acquisition means 71 acquires the input information including the location information indicating the location of each flying object, the airframe information of the flying object, the weather information, and the environmental information (step S71). The risk evaluation means 72 evaluates the risk in a case where the flying object is in the location using the trained risk evaluation model based on the input information and outputs the risk evaluation result (step S72).

According to the risk evaluation device 70 of the second example embodiment, it becomes possible to evaluate in advance the risk which may arise due to the flight of the flying object.

A part or all of the example embodiments described above may also be described as the following supplementary notes, but not limited thereto.

(Supplementary Note 1)

A risk evaluation device comprising:

an acquisition means configured to acquire input information which includes location information indicating a location of a flying object, airframe information of the flying object, weather information, and environmental information; and a risk evaluation means configured to evaluate a risk in a case where the flying object is at the location, using a risk evaluation model which has been trained, based on the input information.

(Supplementary Note 2)

The risk evaluation device according to supplementary note 1, wherein the risk evaluation model is a model which has been trained using the input information and a risk value corresponding to a behavior of the flying object acquired by a simulation based on the input information.

(Supplementary Note 3)

The risk evaluation device according to supplementary note 2, wherein the risk value corresponding to the behavior of the flying object is calculated based on several risks related to the flying object.

(Supplementary Note 4)

The risk evaluation device according to supplementary note 3, wherein the risk value corresponding to the behavior of the flying object is calculated using a weight set for each of the several risks.

(Supplementary Note 5)

The risk evaluation device according to supplementary note 2, wherein the risk value corresponding to the behavior of the flying object is calculated based on a plurality of troubles related to the flying object.

(Supplementary Note 6)

The risk evaluation device according to supplementary note 5, wherein the risk value corresponding to the behavior of the flying object is calculated by using a probability of occurrence of the plurality of troubles related to the flying object.

(Supplementary Note 7)

The risk evaluation device according to supplementary note 2, wherein the risk value corresponding to the behavior of the flying object is calculated using the risk value which is set in advance based on topographical information of an area corresponding to the location of the flying object.

(Supplementary Note 8)

A risk evaluation method comprising:

acquiring input information which includes location information indicating a location of a flying object, airframe information of the flying object, weather information, and environmental information; and evaluating a risk in a case where the flying object is at the location, using a risk evaluation model which has been trained, based on the input information.

(Supplementary Note 9)

A recording medium storing a program, the program causing a computer to perform a process comprising:

acquiring input information which includes location information indicating a location of a flying object, airframe information of the flying object, weather information, and environmental information; and evaluating a risk in a case where the flying object is at the location, using a risk evaluation model which has been trained, based on the input information.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

12 Processor
31 Simulation unit
32 Risk evaluation unit
33 Model training unit
41 Location information input unit
42 Airframe information input unit
43 Weather information input unit
44 Environmental information input unit
45 Risk evaluation unit
46 Risk output unit
100 Risk evaluation device

What is claimed is:

1. A risk evaluation device comprising:

at least one memory configured to store instructions; and at least one processor configured to execute the instructions to:

acquire input information which includes location information indicating a location of a flying object, airframe information of the flying object, weather information, and environmental information;

evaluate a risk in a case where the flying object is at the location, using a risk evaluation model which has been trained, based on the input information;

establish a geographic space with a position of the flying object set as an origin based on the location information;

perform simulation of a trajectory of the flying object based on the risk in the geographic space established;

apply a risk value at a relative location with respect to the flying object for each cell in the geographic space established and for a type of the risk; and acquire, in response to specifying a point by a user on a map which is displayed on a display unit, the location information of the point, and superimpose and display the risk value near the location on the map.

2. The risk evaluation device according to claim 1, wherein the risk evaluation model is a model which has been trained using the input information and a risk value corresponding to a behavior of the flying object acquired by a simulation based on the input information.

3. The risk evaluation device according to claim 2, wherein the risk value corresponding to the behavior of the flying object is calculated based on several risks related to the flying object.

4. The risk evaluation device according to claim 3, wherein the risk value corresponding to the behavior of the flying object is calculated using a weight set for each of the several risks.

5. The risk evaluation device according to claim 2, wherein the risk value corresponding to the behavior of the flying object is calculated based on a plurality of troubles related to the flying object.

6. The risk evaluation device according to claim 5, wherein the risk value corresponding to the behavior of the flying object is calculated by using a probability of occurrence of the plurality of troubles related to the flying object.

7. The risk evaluation device according to claim 2, wherein the risk value corresponding to the behavior of the flying object is calculated using the risk value which is set in advance based on topographical information of an area corresponding to the location of the flying object.

8. A risk evaluation method comprising:

acquiring input information which includes location information indicating a location of a flying object, airframe information of the flying object, weather information, and environmental information;

evaluating a risk in a case where the flying object is at the location, using a risk evaluation model which has been trained, based on the input information;

establishing a geographic space with a position of the flying object set as an origin based on the location information;

performing simulation of a trajectory of the flying object based on the risk in the geographic space established;

applying a risk value at a relative location with respect to the flying object for each cell in the geographic space established and for a type of the risk; and acquiring, in response to specifying a point by a user on a map which is displayed on a display unit, the location information of the point, and superimpose and display the risk value near the location on the map.

9. A non-transitory computer readable recording medium storing a program, the program causing a computer to perform a process comprising:

acquiring input information which includes location information indicating a location of a flying object, airframe information of the flying object, weather information, and environmental information;

evaluating a risk in a case where the flying object is at the location, using a risk evaluation model which has been trained, based on the input information;

establishing a geographic space with a position of the flying object set as an origin based on the location information;

performing simulation of a trajectory of the flying object based on the risk in the geographic space established;

applying a risk value at a relative location with respect to the flying object for each cell in the geographic space established and for a type of the risk; and acquiring, in response to specifying a point by a user on a map which is displayed on a display unit, the location information of the point, and superimpose and display the risk value near the location on the map.

10. The risk evaluation method according to claim 8, wherein the risk evaluation model is a model which has been trained using the input information and a risk value corresponding to a behavior of the flying object acquired by a simulation based on the input information.

11. The risk evaluation method according to claim 10, wherein the risk value corresponding to the behavior of the flying object is calculated based on several risks related to the flying object.

12. The risk evaluation method according to claim 11, wherein the risk value corresponding to the behavior of the flying object is calculated using a weight set for each of the several risks.

13. The risk evaluation method according to claim 11, wherein the risk value corresponding to the behavior of the flying object is calculated based on a plurality of troubles related to the flying object.

14. The risk evaluation method according to claim 13, wherein the risk value corresponding to the behavior of the flying object is calculated by using a probability of occurrence of the plurality of troubles related to the flying object.

15. The risk evaluation method according to claim 11, wherein the risk value corresponding to the behavior of the flying object is calculated using the risk value which is set in advance based on topographical information of an area corresponding to the location of the flying object.

16. The non-transitory computer readable recording medium according to claim 9, wherein the risk evaluation model is a model which has been trained using the input information and a risk value corresponding to a behavior of the flying object acquired by a simulation based on the input information.

17. The non-transitory computer readable recording medium according to claim 16, wherein the risk value corresponding to the behavior of the flying object is calculated based on several risks related to the flying object.

18. The non-transitory computer readable recording medium according to claim 17, wherein the risk value corresponding to the behavior of the flying object is calculated using a weight set for each of the several risks.

19. The non-transitory computer readable recording medium according to claim 17, wherein the risk value corresponding to the behavior of the flying object is calculated based on a plurality of troubles related to the flying object.

20. The non-transitory computer readable recording medium according to claim 19, wherein the risk value corresponding to the behavior of the flying object is calculated by using a probability of occurrence of the plurality of troubles related to the flying object.

* * * * *